Feb. 12, 1963 E. K. YAGER 3,077,540
MEANS FOR SENSING CHANGE IN STATE OF
INPUT ELECTRICAL ENERGY
Filed March 29, 1960 2 Sheets-Sheet 1

INVENTOR.
EDWIN K. YAGER
BY Fulwider, Mattingly
& Huntley
ATTORNEY

INVENTOR.
EDWIN K. YAGER

United States Patent Office 3,077,540
Patented Feb. 12, 1963

3,077,540
MEANS FOR SENSING CHANGE IN STATE OF
INPUT ELECTRICAL ENERGY
Edwin K. Yager, 4766 Academy Place,
San Diego 9, Calif.
Filed Mar. 29, 1960, Ser. No. 18,344
6 Claims. (Cl. 250—230)

The present invention relates to a means for sensing a change in state of input electrical energy and providing an output signal responsive thereto, and more particularly to such a means which utilizes the high sensitivity of instruments energizable by electrical energy to move a radiant energy reflective surface.

The present invention has particular applicability to servo systems, although it is to be understood that the invention is not limited thereto. In general, servo systems of the prior art are of the null balance type wherein the controlled device is driven by some form of motor until its position corresponds to a pre-selected null or balance position. At the balance position power is cut off from the motor or other driving mechanism. The accuracy of the system, that is, the degree of correspondence between the pre-selected and actual positions of the controlled device, predominately depends upon the element or elements which sense the establishment of the null position, or the deviation from that null position. Direct current amplifiers used as such sensing elements are limited by their inherent instability to a resolution of approximately one part in $10^4$, and in many situations greater accuracy is required.

The prior art has also utilized light beam galvanometers as such sensing elements because of the capability of such galvanometers to measure and control minute quantities of electrical energy. However, the prior art has not utilized the inherent capability of such galvanometers for withstanding or handling electrical energy greatly in excess of their sensitive range, and where such galvanometers have been employed, the systems in which they were used are undesirably affected by any non-linearity of the galvanometer movement.

Prior art systems utilizing sensing apparatus which includes vacuum tubes are also ineffective to provide great accuracy, because of the relative instability of such vacuum tubes. Even though complex and expensive circuitry employing choppers or the like have been used in an attempt to improve the stability of the vacuum tube sensing apparatus, the accuracies obtainable have still not exceeded one part in $10^4$. In contrast, the present invention is adapted to produce very high accuracies by reason of the novel employment of devices such as galvanometers in circuits which effect the sensing function without dependence upon the linearity of the galvanometer movement.

According to the present invention, there is provided apparatus for producing a beam of radiant energy, this apparatus including an element which is movable in response to an input signal to move or reflect the beam of radiant energy in a direction corresponding with the direction of change of the input signal. In one embodiment of the invention, this reflected radiant energy beam is directed toward a pair of radiant energy sensitive devices, each of which is operative to control one of a pair of switching devices upon interception of the beam by the radiant energy sensitive device. The pair of switching devices is each operative to provide an output signal. Thus, since the direction of movement of the radiant energy beam is indicative of the direction of change of the input signal, and since the location of the radiant energy beam is established by operation of one or neither of the radiant energy sensitive devices, it is seen that the change in the input signal is indicated by which of the switching means is operated. If neither is operated, the beam is between the radiant energy sensitive devices, and the lack of output signal indicates existence of the "null" condition. In another embodiment of the present invention, which will be described in greater detail hereinafter, the radiant energy sensitive devices and the logic of the circuitry is such that the "null" condition occurs when both of the pair of radiant energy sensitive devices are illuminated.

The magnitude of the output signal is substantially independent of the magnitude of the change in input signal because the radiant energy sensitive devices are operated as bistable devices, as will be seen.

The present invention preferably includes a means for limiting the input electrical energy to insure that very high levels are not applied to the energy sensing portion of the present invention. Also, although a pair of the radiant energy sensitive means are preferably employed, three and even more may be used if desired, the spacing between the radiant energy sensitive devices and the width of the radiant energy beam being adjusted to suit the requirements of the particular situation. That is, where two radiant energy sensitive devices are employed, an output signal is provided if one or the other of them is intercepted by the beam, and no signal for the null position when the beam is midway between them. To produce this result, the sensing surfaces of the devices are spaced apart a distance at least equal to the width of the radiant energy beam passing therebetween so that the beam can be located between the devices without operating either of them. If desired, the null position can be made to occur when both devices are intercepted by the beam, in which case the output signals would occur only when one or the other of the devices is intercepted. This would require a close spacing of the devices and a wider beam so that the beam would be capable of intercepting both devices simultaneously.

Where the present invention is used in combination with other elements of a typical servo system, the sensing accuracy attributable to the invention approaches one part in $10^{10}$, thereby greatly improving the accuracy of the overall system. Even in systems where great accuracy is not required, the present invention can be economically and reliably employed because of the simplicity and low cost of apparatus embodying the invention.

In a typical servo system, for example, the present invention utilizes a conventional light beam galvanometer whose mirror rotation is limited in both directions to thereby adjust which of the pair of light sensitive devices is illuminated. Means are also preferably provided for limiting the magnitude of the current passing through the galvanometer coil. Further, an optical system is provided for forming and projecting a beam of light against the mirror of the galvanometer, and a pair of light sensitive devices such as photocells are arranged to intercept the reflected light beam. Of course, it will be apparent that although reference is made to a light beam the present invention is easily adapted to the use of some other form of radiant energy, such as infrared.

Through the use of conventional galvanometers, the present invention takes advantage of the inherent stability and accuracy of galvanometer movements, and particularly the ability of such movements to pass relatively high quantities of electrical energy without zero shift or damage to such movements.

However, the present invention uniquely utilizes the sensitivity of galvanometer movements without suffering the inaccuracies associated with non-linearities of such movements. That is, displacement of the mirror occurs in the usual fashion at very low levels of input electrical energy, sensitively responding to any changes in such input energy. However, the movement of the mirror is limited in both directions so that once the mirror is up against its stops further increase in the input signal does not result in a corresponding increase in displacement of the mirror. Thus, non-linearities of response in the galvanometer coil do not affect the position of the mirror once it has engaged its stops.

With the mirror against one of its stops, the light beam, in one embodiment of the invention, will be directed against one of the photocells, and when the mirror is against its other stop the light beam will be directed upon the other photocell. When the mirror is midway between its stops, neither of the photocells is illuminated. Thus, very slight changes in electrical input energy will cause illumination of one of the photocels, but further change in the input signal will not be effective to further move the mirror and cut off such illumination.

The photocells are employed as bi-stable devices in combination with a pair of switching devices such as a pair of thyratrons, and the photocells are operative to trigger the thyratrons which in turn provide output signals indicative of the location of the light beam, and thus indicative of the direction of change in the input signal to the galvanometer. More particularly, the thyratrons are characterized by a threshold bias above which they will not fire to produce an output signal, and when one of the photocells receives sufficient light to saturate it, the photocell is operative to reduce the bias of the thyratron to fire it. The bias of each thyratron is adjusted so that it will fire immediately upon interception of the light beam by its associated photocell. Thus, beyond the amount of light sufficient to operate each photocell, the light gradient is immaterial. Likewise, it is noted that this arrangement of the photocells and the thyratrons effects operation of the photocells as bi-stable devices; illuminated they cause the thyratrons to fire, unilluminated they have no affect on the thyratrons. In this way the output signals of the thyratrons are essentially independent of the non-linearities of the photocells and the galvanometer. Only a small portion of the galvanometer mirror displacement capability need be utilized to effect operation of the photocells.

Other objects and features of the present invention will be readily apparent to those skilled in the art from the following specification and appended drawings wherein are illustrated preferred forms of the invention, and in which.

Figure 1:
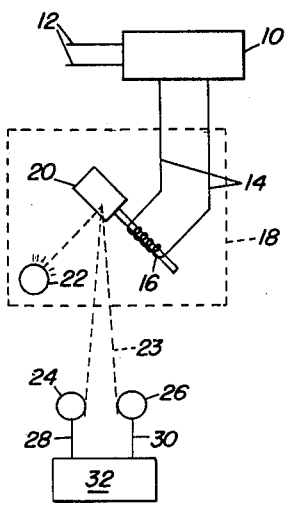
FIGURE 1 is a schematic representation of a circuit employing the present invention.

Referring now to the drawings and particularly to FIGURE 1, the present invention is illustrated employing a current limiting apparatus or circuit 10 which accepts an input current through leads 12, and limits the magnitude of the current flowing through its output leads 14 to a coil 16 of a usual and conventional light beam galvanometer 18. Galvanometer 18 includes a beam locating element or mirror 20 which, as illustrated, is movable in response to energization of coil 16.

Light beam galvanometer 18 is part of a means or apparatus for providing and directing a beam of radiant energy or light, these means also including a light source 22 which is effective to produce a radiant energy or light beam 23 for reflection by element 20 toward a pair of radiant energy or light sensitive devices 24 and 26. As will hereinafter be described more particularly, devices 24 and 26 are operative upon interception of light beam 23 to control through leads 28 and 30 the output circuitry 32. The general showing of FIGURE 1 illustrates the broader aspects of the present invention.

Figure 2:
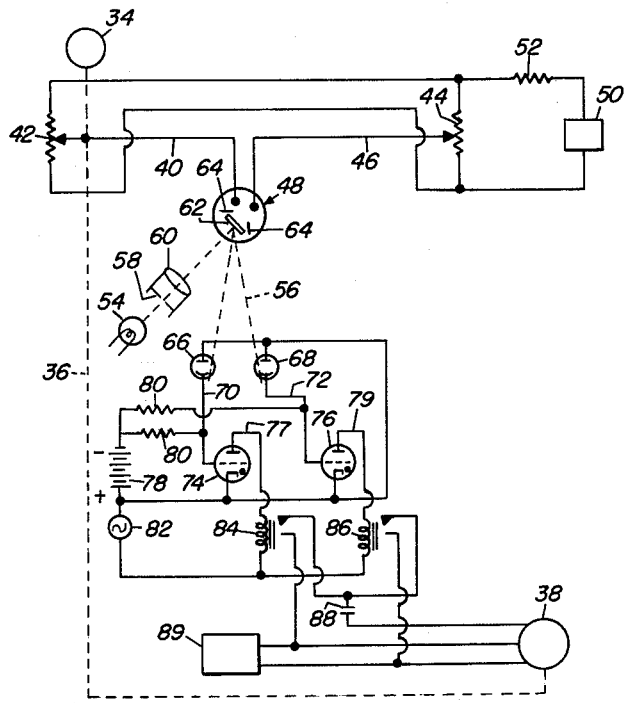
FIGURE 2 is a circuit diagram of a servo system employing the invention illustrated in FIGURE 1.

Reference is made to FIGURE 2 for an exemplary showing of the invention as a part of a servo loop for controlling the position of a physical object 34. Object 34 is mechanically connected by a linkage 36 to a motor 38 and to the wiper arm 40 of a potentiometer 42. Operation of motor 38 is effective to move object 34 in one of two directions, depending upon the direction of rotation of motor 38, and the linkage to wiper arm 40 provides a means whereby the position of object 34 is sensed by potentiometer 42.

Potentiometer 42 forms a part of a means which is responsive to a change in input electrical energy to operate the galvanometer 18, and in this case is constituted by a standard bridge circuit which includes a control potentiometer 44 connected in parallel with potentiometer 42. A wiper arm 46 of potentiometer 44 and the wiper arm 40 are connected to opposite ends of the coil of a usual and conventional light beam galvanometer 48. A power supply 50 is provided to energize the bridge circuit, and is connected in series with a current limiting resistor 52 whose value is selected such that the output signal from the bridge circuit never exceeds the level of signal which galvanometer 48 is capable of tolerating without damage or zero shift, that is, never reaches a damaging energy level.

In order for "null" position to exist, object 34, and consequently wiper arm 40 of potentiometer 42, must be in a position with respect to wiper 46 of potentiometer 44 such that the potential between arms 40 and 46 is zero or a value too low to produce an output signal which will operate galvanometer 48. However, when object 34 deviates from its null position, wiper arm 40 will also be moved from its null position and the balance of the bridge will be destroyed. Likewise if wiper arm 46 is moved from its null position the balance of the bridge will be destroyed. Typically a displacement of the wiper arm of one part in one millionth of its full scale range is sufficient to destroy the balance of the bridge to an extent capable of exceeding the threshold energy level of the galvanometer and causing movement of the reflecting element of the galvanometer.

The potential developed between arms 40 and 46 by such an unbalance produces an output signal of a direction corresponding to the direction of departure from null position of the particular wiper arm moved.

The potentiometer bridge circuit described is merely exemplary of one type of means for applying the change in input electrical energy to the galvanometer 48. As will become apparent, changes in voltage, impedance and the like, as well as current changes, may be sensed by means including an element movable in one direction or the other in correspondence with the direction of change in the state of electrical input energy to it. The movement of the element is effective, as will be seen, to initiate the generation of output signals representative of the changes in state of input energy, and with a very high degree of accuracy.

The exemplary bridge circuit provides an output signal to galvanometer 48 when object 34 departs from its null position, and, as will be seen, results in a signal which initiates the return of object 34 to its null position to balance the bridge circuit.

A source of radiant energy, in this case an incandescent lamp 54, provides light which is shaped by an opaque shield 58, and focused by a lens system 60 onto a movable element or mirror 62 of galvanometer 48. The reflected light takes the form of a light beam 56 having a particular width.

Mirror 62 is movable in one direction or the other according to the direction of current flow energizing the usual coil of galvanometer 48. The movement of mirror 62 effects a corresponding movement of beam 56, and it will be apparent that the direction of movement of beam 56 thereby is representative of the character of the input energy to the galvanometer coil.

A pair of stop elements 64 are suitably positioned upon galvanometer 48 at either side of mirror 62 to limit the pivotal movement of mirror 62. With this arrangement the extreme positions of light beam 56 may be adjustably limited. In the embodiment of FIGURE 2, stops 64 are adjusted such that beam 56 cannot move laterally beyond the radiant energy sensitive surfaces of a pair of spaced apart radiant energy sensitive devices 66 and 68. These devices, in the preferred embodiments of the present invention, take the form of photocells of the type characterized by a reduction of internal impedance upon exposure to light. These photocells include radiant energy sensitive surfaces having a particular width, by which is meant the length of the surface across which beam 56 can sweep. The adjacent edges of these surfaces are spaced apart a distance approximately equal to the width of beam 56 at the point where it passes between them so that beam 56 is incapable of illuminating more than one of the surfaces at a time. Further, by reason of the spacing of these surfaces it is seen that beam 56 can be located between them, without illuminating either.

When beam 56 is located between photocells 66 and 68 without illuminating either of them, beam 56 is in the null position in the embodiment of FIGURE 2. When beam 56 is intercepted by one or the other of photocells 66 or 68, an output signal is generated by the system. As will be seen, when photocell 66 is illuminated the logic of the circuitry to motor 38 is such that motor 38 is rotated in one direction, while illumination of photocell 68 effects rotation of motor 38 in the opposite direction. Motor 38 is cut off when neither photocell is illuminated.

The cathodes of photocells 66 and 68 are connected through leads 70 and 72 to a pair of switching means, such as thyratrons 74 and 76, leads 70 and 72 being connected to the control grids of thyratrons 74 and 76. The anodes of photocells 66 and 68 are connected together and coupled to the cathodes of thyratrons 74 and 76 and to the positive side of a power supply or battery 78. The negative side of battery 78 is connected to each of a pair of resistors 80 which are each connected to a separate one of leads 70 and 72. Battery 78 serves as a source of steady state voltage of sufficient magnitude to prevent conduction of thyratrons 74 and 76 when no light is impinging upon either of photocells 66 or 68.

The circuit connecting the anodes of photocells 66 and 68 and the cathodes of thyratrons 74 and 76 to battery 78 is also connected to one side of a source of alternating current 82. The other side of source 82 is connected to the anodes or plates of thyratrons 74 and 76 through the coils of a pair of relays 84 and 86, respectively, each of which has a pair of normally open contacts. With this arrangement when either of thyratrons 74 or 76 is fired, power from source 82 passes from the cathode to the anode of the thyratron, and thence as an output signal through leads 77 or 79, as the case may be.

One side of each of the contacts of relays 84 and 86 is connected together and through capacitor 88, to the capacitor input of a three wire capacitor run single phase motor 38. The other sides of these contacts are each connected, respectively, to the other two input leads to motor 38, these latter leads being connected to a source of A.C. power 89.

In operation, when object 34 departs from its null position, wiper 40 experiences a corresponding movement which causes an imbalance in the bridge circuit. Current flows between the wipers of potentiometers 42 and 44, the direction of the current corresponding with the direction of movement of object 34. Consequent energization of the galvanometer coil causes mirror 62 to pivot, moving beam 56 away from its null position between photocells 66 and 68 and upon one or the other of the photocells. Regardless of the magnitude of current flow between wipers 42 and 44, that is the magnitude of the change in input energy to galvanometer 48, stops 64 prevent mirror 62 from pivoting past the photosensitive areas of photocells 66 and 68.

Assuming photocell 66 is illuminated, the characteristic decrease in its internal impedance reduces the bias on thyratron 74, permitting current to flow through thyratron 74 to energize relay 84. That is, thyratron 74 acts as a switch which is actuated by photocell 66 to switch power from source 82 to relay 84.

Energization of relay 84 pulls in or closes the contacts of relay 84 to close the circuit between A.C. source 89 and motor 38, thereby causing motor 38 to rotate. Conversely, conduction of thyratron 76 would have the effect of initiating rotation of motor 38 in the opposite direction.

Relays 84 and 86 may be either of the A.C. type or the D.C. type with capacitors across the windings and rectifiers in series, it being important mainly to note that each functions to pull in or close its contacts when its associated thyratron is conducting.

Rotation of motor 38 effects a corresponding movement of wiper 40 until the null position of wiper 40 is achieved, at which time beam 56 will be midway between photocells 66 and 68, intercepting neither. This raises the bias on that one of thyratrons 74 or 76 which is being operated, and since A.C. voltage is being applied to the plate of the thyratron, the thyratron ceases to conduct immediately upon the establishment of that bias level which is sufficient to prevent its conduction.

With the arrangement described, all that is necessary to operate photocells 66 and 68 is a very slight change in the direction of beam 56, which in turn is effected by a very slight flow of current through the highly sensitive galvanometer 48. The magnitude of the current flow through galvanometer 48 beyond that which is necessary to move mirror 62 has no effect on the operation of the photocells, the thyratrons, or the motor 38, and thus the system is essentially independent of the linearity of galvanometer 48.

Figure 3:
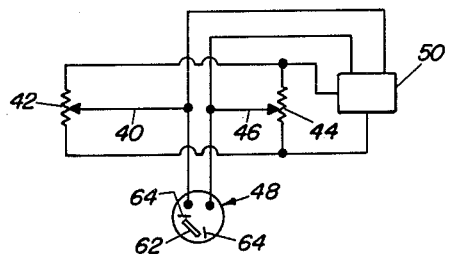
FIGURE 3 is a circuit diagram illustrating one means for limiting the magnitude of the input electrical energy to the galvanometer.

FIGURE 3 illustrates another means for controlling or limiting the amount of current flowing through galvanometer 48. In this case the coil of galvanometer 48 is electrically coupled to power supply 50 so that a control voltage is developed across the coil of galvanometer 48 which is effective to reduce excitation as current through the galvanometer coil begins to increase.

Other techniques for limiting the magnitude of input electrical energy will immediately suggest themselves to those skilled in the art, and the present invention is not limited to any particular one of such techniques.

Figure 4:
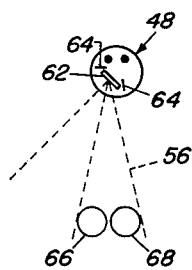
FIGURE 4 is a schematic representation of the arrangement of the pair of photocells in another embodiment of the present invention.
Figure 5:
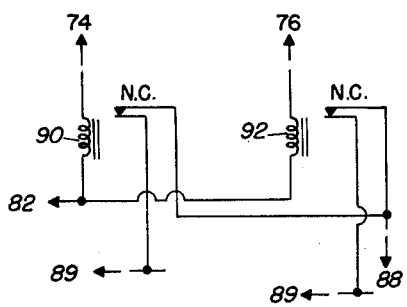
FIGURE 5 is a circuit diagram illustrating a switching arrangement employed with the embodiment of FIGURE 4.

Other circuits can be provided in which the null position of a beam such as light beam 56 is not between a pair of photocells. FIGURES 4 and 5 illustrate another embodiment of the present invention in which the photosensitive areas of photocells 66 and 68, as represented by circles in FIGURE 4, are spaced fairly close together, and beam 56 is made wide enough to simultaneously illuminate both of photocells 66 and 68. This constitutes the null position for the system of FIGURES 4 and 5, and illumination of only one of the photocells will cause the generation of an error signal, as will be seen. Stops 64 are arranged so that mirror 62 cannot pivot beam 56 to a position beyond, that is laterally outwardly of, photocells 66 and 68. Thus, in contrast with the embodiment of FIGURE 2, one of the photocells will always be illuminated.

FIGURE 5 illustrates the arrangement and circuitry of a pair of relays 90 and 92, each having a pair of normally closed contacts, to accomplish the function of the embodiment of FIGURE 2, but using the arrangement of FIGURE 4. The embodiments of FIGURES 2 and 5 are identical except for the circuitry and relays 90 and 92 shown in FIGURE 5, and like numerals are employed to designate like parts.

The coils of relays 90 and 92 are connected to thyratrons 74 and 76 and to A.C. source 82 in a manner identical to that illustrated for relays 84 and 86 in FIGURE 2. Similarly, the connections for the contacts of relays 90 and 92 are identical to that shown in FIGURE 2, the only difference in the circuitry being that relays 90 and 92 are normally closed, rather than normally open as was the case with relays 84 and 86.

In operation, when only photocell 68 is illuminated, relay 92 opens, and closed relay 90 switches power to drive motor 38 in a direction which will effect movement of beam 56 toward photocell 66. When beam 56 intercepts both photocells 66 and 68, both relays 90 and 92 will open, cutting off power to motor 38. This is then the null position of the system. It will be apparent that, in an analogous way, illumination of only photocell 66 will switch power to drive motor 38 in a direction which will effect movement of beam 56 toward photocell 68.

Figure 6:
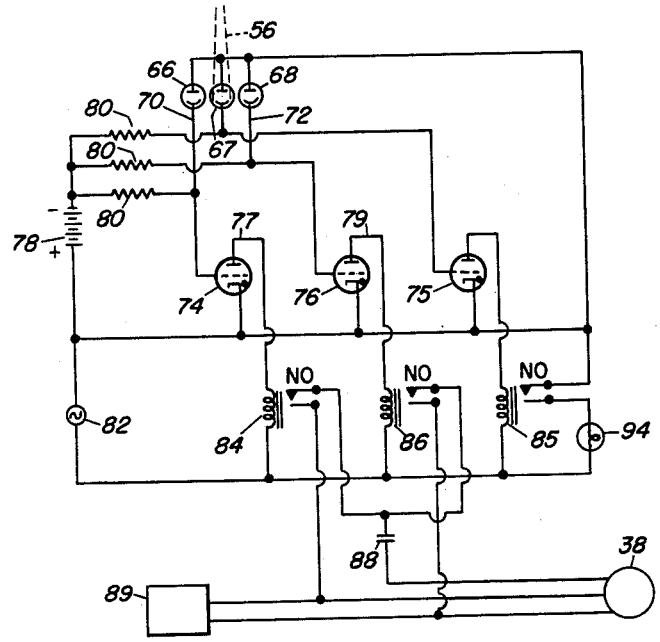
FIGURE 6 is a circuit diagram of a portion of a servo system which employs three radiant energy sensitive devices in another embodiment of the present invention.

In FIGURE 6 there is illustrated another embodiment of the invention, this embodiment being substantially identical in most respects to the embodiment of FIGURE 2, except for the addition of a third photocell 67, a third thyratron 75, and a third normally open relay 85. Like numerals are employed to designate like parts in the embodiments of FIGURES 2 and 6.

The third photocell 67 is placed between photocells 66 and 68, with the width of beam 56 being the same as in FIGURE 2. That is, the width of beam 56 is narrow enough that in its null position between photocells 66 and 68, neither of photocells 66 or 68 is illuminated. However, in the embodiment of FIGURE 6, photocell 67 is located in the space between the other photocells so that in its null position beam 56 illuminates only photocell 67.

The cathode of photocell 67 is connected through a resistor 80 to the negative side of battery 78, and to the control grid of thyratron 75. The anode of photocell 67 is connected to the cathode of thyratron 75, and to the positive side of battery 78 and to one side of source 82.

The plate or anode of thyratron 75 is connected through the coil of relay 85 to the other side of A.C. source 82. One of the contacts of relay 85 is connected to the lead which is connected to the cathodes of the thyratrons and to one side of source 82, and the other contact of the relay is connected through a warning light 94 to the other side of source 82.

With this arrangement, illumination of photocell 67 will close relay 85, and turn on light 94 to indicate that object 34 is in its null position. Thus, the system indicates the establishment of the null position.

Figure 7:
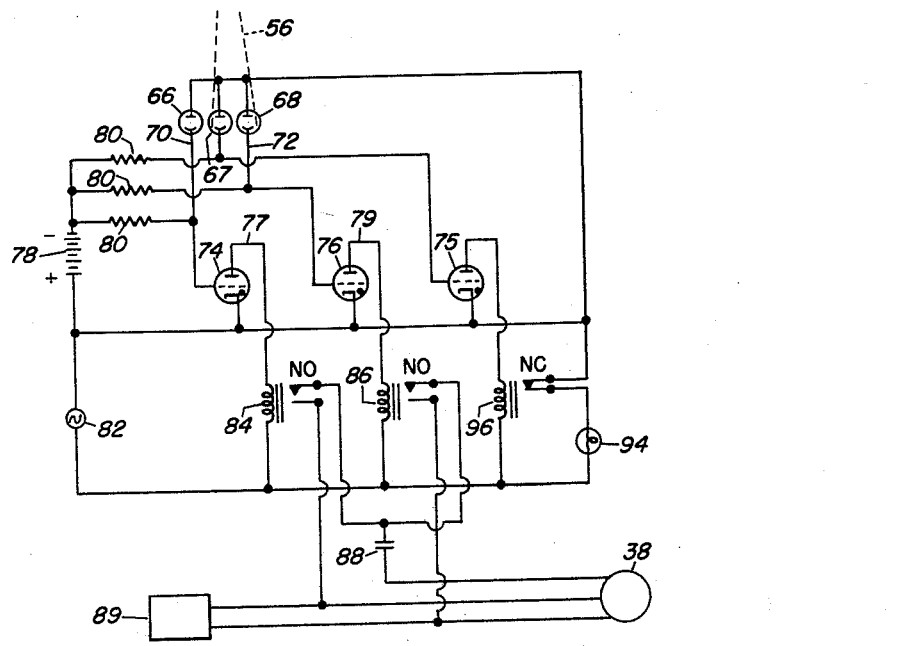
FIGURE 7 is a circuit diagram of a portion of a servo system which employs three radiant energy sensitive devices in still another embodiment of the present invention.

Still another embodiment is illustrated in FIGURE 7. This embodiment is identical to the embodiment of FIGURE 6 except that a relay 96, having normally closed contacts, is employed in place of relay 85, which has normally open contacts. The embodiments are different also in the width of beam 56 employed.

In the embodiment of FIGURE 7 the sensitive areas of photocells 66, 67 and 68 are spaced apart equally. Further, the space between each of the sensitive areas is made equal to the swept or lateral width of one of the sensitive areas. In addition, beam 56 is arranged or shaped to be three times the width of one of the sensitive areas. Thus, beam 56 will always intercept the photocells in combinations of 66 and 67, 67 alone, or 67 and 68. The interception of photocell 67 alone is defined as the null position. Since photocell 67 is illuminated in all of these cases, relay 96 is open, and the light or buzzer 94 is not actuated. However, if beam 56 should go out for some reason, relay 96 would immediately close to actuate the light 94 and give a warning indication of the failure.

From the foregoing description it is seen that the stability of the systems according to the present invention are solely dependent upon the stability of highly sensitive sensing means such as galvanometers. Further, the accuracy of the systems is essentially independent of the linearity of the photocells or the thyratrons, since these components are employed as bi-stable devices in the present invention, and also essentially independent of the linearity of the galvanometer. Further, if it is desired to use the present invention to sense voltage changes in an input signal, rather than current changes, galvanometer 48 can be replaced with a conventional electrometer-mirror device. Also, the invention is adapted to employ photocells of the type which independently generate a signal in response to illumination, and this signal would operate the thyratrons or other switching devices. This is in contrast to photocells 66 and 68 which operate the thyratrons by virtue of the reduction in internal impedance upon exposure to light beam 56.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. Means for sensing a change in state of input electrical energy and providing an output signal responsive thereto, said means comprising: a plurality of radiant energy sensitive devices; apparatus providing a beam of radiant energy and including a beam locating element movable to locate said beam along an arc which includes all of said radiant energy sensitive devices, said apparatus being operative upon energization between a threshold energy level and a damaging energy level to move said beam locating element, and damaged upon energization at or above said damaging energy level; means for applying to said apparatus said change in state of input electrical energy to operate said apparatus to move said beam locating element in a direction corresponding to the direction of said change, including control means for applying to said apparatus only that portion of said change as will energize said apparatus below said damaging energy level, said apparatus including a pair of spaced stops engageable by said beam locating element to limit said arc for said beam to always include one of said radiant energy sensitive devices, one of said stops being engaged by said beam locating element when said apparatus is energized at a level slightly above said threshold energy level and substantially below said damaging energy level; and a plurality of switching means, each of which is actuable for connection with a power source to provide an output signal, each of said plurality of switching means being connected to a separate one of said radiant energy devices, each of said radiant energy sensitive devices being operative upon interception of said beam to actuate the associated one of said switching means to thereby provide an output signal representing the direction of said change in state, substantially independently of the magnitude of said change in state.

2. Means for sensing a change in state of input electrical energy and providing an output signal responsive thereto, said means comprising: a pair of spaced apart radiant energy sensitive devices; apparatus providing a beam of radiant energy and including a beam locating element movable to locate said beam along an arc which includes both of said radiant energy sensitive devices, said apparatus being operative upon energization between a threshold energy level and a damaging energy level to move said beam locating element, and damaged upon energization at or above said damaging energy level, said apparatus also including means limiting the width of said beam such that said beam can pass between said pair of radiant energy sensitive devices without intercepting either; means for applying to said apparatus said change in state of input electrical energy to operate said apparatus to move said beam locating element in a direction corresponding to the direction of said change, including control means for applying to said apparatus only that portion of said change as will energize said apparatus below said damaging energy level, said apparatus including a pair of spaced stops engageable by said beam locating element to limit said arc for said beam to always include one of said pair of radiant energy sensitive devices at each terminus of said arc, one of said stops being engaged by said beam locating element when said apparatus is energized at a level slightly above said threshold energy level and substantially below said damaging energy level; and a pair of switching means, each of which is actuable for connection with a power source to provide an output signal, each of said plurality of switching means being connected to a separate one of said radiant energy devices, each of said radiant energy sensitive devices being operative upon interception of said beam to actuate the associated one of said switching means to thereby provide an output signal representing the direction of said change in state, substantially independently of the magnitude of said change in state.

3. Means for sensing a change in state of input electrical energy and providing an output signal responsive thereto, said means comprising: a pair of radiant energy sensitive devices positioned closely adjacent to each other; apparatus providing a beam of radiant energy and including a beam locating element movable to locate said beam along an arc which includes both of said radiant energy sensitive devices, said apparatus being operative upon energization between a threshold energy level and a damaging energy level to move said beam locating element, and damaged upon energization at or above said damaging energy level, said apparatus also including means shaping the width of said beam such that said beam simultaneously illuminates both of said pair of radiant energy sensitive devices in its null position; means for applying to said apparatus said change in state of input electrical energy to operate said apparatus to move said beam locating element in a direction corresponding to the direction of said change, including control means for applying to said apparatus only that portion of said change as will energize said apparatus below said damaging energy level, said apparatus including a pair of spaced stops engageable by said beam locating element to locate said beam upon only one of said radiant energy sensitive devices at each terminus of said arc, one of said stops being engaged by said beam locating element when said apparatus is energized at a level slightly above said threshold energy level and substantially below said damaging energy level; and a pair of switching means, each of which is actuable for connection with a power source to provide an output signal, each of said plurality of switching means being connected to a separate one of said radiant energy devices, each of said radiant energy sensitive devices being operative upon interception of said beam to actuate the associated one of said switching means to thereby provide an output signal representing the direction of said change in state, substantially independently of the magnitude of said change in state, interception of both of said radiant energy sensitive devices providing simultaneous output signals from said switching means to indicate a lack of said change in state.

4. Means for sensing a change in state of input electrical energy and providing an output signal responsive thereto, said means comprising: a pair of spaced apart radiant energy sensitive devices; a third radiant energy sensitive device located in the space between said pair of radiant energy sensitive devices; apparatus providing a beam of radiant energy and including a beam locating element movable to locate said beam along an arc which includes all of said radiant energy sensitive devices, said apparatus being operative upon energization between a threshold energy level and a damaging energy level to move said beam locating element, and damaged upon energization at or above said damaging energy level, said apparatus also including means limiting the width of said beam such that said beam can pass between said pair of radiant energy sensitive devices, without intercepting either, to intercept said third radiant energy sensitive device; means for applying to said apparatus said change in state of input electrical energy to operate said apparatus to move said beam locating element in a direction corresponding to the direction of said change, including control means for applying to said apparatus only that portion of said change as will energize said apparatus below said damaging energy level, said apparatus including a pair of spaced stops engageable by said beam locating element to limit said arc for said beam to always include one of said pair of radiant energy sensitive devices at each terminus of said arc of travel, one of said stops being engaged by said beam locating element when said apparatus is energized at a level slightly above said threshold energy level and substantially below said damaging energy level; and three switching means, each of which is actuable for connection with a power source to provide an output signal, each of said three switching means being connected to a separate one of said radiant energy sensitive devices, each of said pair of radiant energy sensitive devices being operative upon interception of said beam to actuate the associated one of said three switching means to thereby provide an output signal representing the direction of said change in state, substantially independently of the magnitude of said change in state, said third energy sensitive device being operative upon interception of said beam to actuate the associated one of said three switching means to thereby provide an output signal indicative of the location of said beam in a null position between said pair of radiant energy sensitive devices.

5. Means for sensing a change in state of input electrical energy and providing an output signal responsive thereto, said means comprising: a pair of spaced apart radiant energy sensitive devices; a third radiant energy sensitive device located in the space between said pair of radiant energy sensitive devices; apparatus providing a beam of radiant energy and including a beam locating element movable to locate said beam along an arc which includes all of said radiant energy sensitive devices, said apparatus being operative upon energization between a threshold energy level and a damaging energy level to move said beam locating element, and damaged upon energization at or above said damaging energy level, said apparatus further including means shaping the width of said beam such that said beam simultaneously illuminates said third radiant energy sensitive device and one of said pair of radiant energy sensitive devices, said pair of radiant energy sensitive devices being sufficiently spaced apart that said beam illuminates only said third radiant energy sensitive device in the null position of said beam; means for applying to said apparatus said change in state of input electrical energy to operate said apparatus to move said beam locating element in a direction corresponding to the direction of said change, including control means for applying to said apparatus only that portion of said change as will energize said apparatus below said damaging energy level, said apparatus including a pair of spaced stops engageable by said beam locating element to limit said arc for said beam to always include one of said pair of radiant energy sensitive devices at each terminus of said arc of travel, one of said stops being engaged by said beam locating element when said apparatus is energized at a level slightly above said threshold energy level and substantially below said damaging energy level; and three switching means, each of which is actuable for connection with a power source to provide an output signal, each of said three switching means being connected to a separate one of said radiant energy sensitive devices, said third energy sensitive device being operative upon interception of said beam to actuate the associated one of said three switching means to thereby provide an output signal indicative of the location of said beam in a null position between said pair of radiant energy sensitive devices, each of said pair of radiant energy sensitive devices being operative, upon its interception of said beam simultaneously with said third energy sensitive device, to actuate the associated one of said three switching means to thereby provide an output signal representing the direction of said change in state, substantially independently of the magnitude of said change in state.

6. Means for sensing a change in state of input electrical energy and providing an output signal responsive thereto, said means comprising: a pair of spaced apart photocells; apparatus providing a beam of light and including a galvanometer having a mirror disposed in the path of said beam and coupled to the galvanometer coil, said mirror being movable by said coil to locate said beam along an arc which includes both of said photocells, said coil being operative between a threshold energy level, at which said mirror is just moved, and a damaging energy level, at which said coil is damaged, to move said mirror, said beam being of a width to pass between said photocells without intercepting either, said galvanometer including a pair of spaced stops engageable during movement of said mirror to limit said arc for said beam to always include one of said photocells at each terminus of said arc, one of said stops being engaged when said coil is energized at a level slightly above said threshold energy level and substantially below said damaging energy level; means for applying to said apparatus said change in state of input electrical energy to operate said coil to move said mirror in a direction corresponding to the direction of said change, including control means for applying to said coil only that portion of said change as will energize said coil below said damaging level; and a pair of switching means, each of which is actuable for connection with a power source to provide an output signal, each of said switching means being connected to a separate one of said photocells, each of said photocells being operative upon interception of said beam to actuate the associated one of said switching means to thereby provide an output signal representing the direction of said change in state, substantially independently of the magnitude of said change in state.

References Cited in the file of this patent

UNITED STATES PATENTS

| | | |
|---|---|---|
| 1,819,439 | Peterson | Aug. 18, 1931 |
| 1,822,075 | Aronoff | Sept. 8, 1931 |
| 2,136,682 | Gilbert | Nov. 15, 1938 |
| 2,268,612 | Muller | Jan. 6, 1942 |
| 2,818,529 | Jaffe | Dec. 31, 1957 |
| 2,820,182 | Martin | Jan. 14, 1958 |